(12) United States Patent
Düweling et al.

(10) Patent No.: US 10,106,224 B2
(45) Date of Patent: Oct. 23, 2018

(54) FRONT DERAILLEUR DEVICE FOR A BICYCLE CHAIN SHIFT

(71) Applicant: SRAM, LLC, Chicago, IL (US)

(72) Inventors: Sebastian Düweling, Schonungen (DE); Markus Engel, Schweinfurt (DE)

(73) Assignee: SRAM DEUTSCHLAND, GMBH, Schweinfurt (DE)

( * ) Notice: Subject to any disclaimer, the term of this patent is extended or adjusted under 35 U.S.C. 154(b) by 214 days.

(21) Appl. No.: 15/231,041

(22) Filed: Aug. 8, 2016

(65) Prior Publication Data
US 2017/0036736 A1    Feb. 9, 2017

(30) Foreign Application Priority Data

Aug. 6, 2015  (DE) .................. 10 2015 010 311

(51) Int. Cl.
| F16H 9/00 | (2006.01) |
| F16H 59/00 | (2006.01) |
| F16H 61/00 | (2006.01) |
| F16H 63/00 | (2006.01) |
| B62M 9/1342 | (2010.01) |
| B62M 9/137 | (2010.01) |
| B62M 9/134 | (2010.01) |

(52) U.S. Cl.
CPC .......... B62M 9/1342 (2013.01); B62M 9/137 (2013.01); B62M 9/134 (2013.01)

(58) Field of Classification Search
CPC .. B62M 9/1342; B62M 9/1242; B62M 9/135; B62M 9/136; B62M 9/137
USPC ...................................... 474/80, 82
See application file for complete search history.

(56) References Cited

U.S. PATENT DOCUMENTS

| 3,927,904 | A | * | 12/1975 | Bergles | ................ B62M 9/1242 280/236 |
| 4,002,080 | A | * | 1/1977 | Huret | ................... B62M 9/1242 474/82 |
| 4,030,347 | A | * | 6/1977 | Norris | ...................... G01B 7/22 361/283.3 |
| 4,030,374 | A | * | 6/1977 | Isobe | ................... B62M 9/1342 474/82 |
| 4,061,048 | A | * | 12/1977 | Huret | ................... B62M 9/1242 474/82 |
| 4,424,048 | A | * | 1/1984 | Shimano | ................ B62M 9/137 474/82 |

(Continued)

FOREIGN PATENT DOCUMENTS

| DE | 102014007566 | 11/2014 |
| DE | 102014010367 | 1/2015 |

(Continued)

*Primary Examiner* — Henry Y Liu

(57) ABSTRACT

A front derailleur device for a bicycle chain shift includes a frame fixing part for attachment to a bicycle frame, a hinge arrangement which is pivotable relative to the frame fixing part, and a chain cage which is pivotable relative to the frame fixing part via the pivotable hinge arrangement for guiding and pivoting of the bicycle chain. The hinge arrangement includes at least two hinged struts which can be mounted rotatably relative to the frame fixing part and relative to the chain cage about pivot axes. The pivot axes run substantially parallel to each other and, in a mounted state of the derailleur device on a bicycle, may be oriented substantially vertically.

19 Claims, 13 Drawing Sheets

(56) References Cited

U.S. PATENT DOCUMENTS

| | | | | |
|---|---|---|---|---|
| 4,543,078 | A * | 9/1985 | Coue | B62M 9/1342 474/82 |
| 4,613,319 | A * | 9/1986 | Nagano | B62M 9/136 474/80 |
| 4,840,605 | A * | 6/1989 | Testa | B62M 9/124 474/80 |
| 5,620,383 | A * | 4/1997 | Patterson | B62M 9/12 474/80 |
| 5,620,384 | A * | 4/1997 | Kojima | B62M 9/1342 474/123 |
| 5,624,334 | A * | 4/1997 | Lumpkin | B62M 9/127 474/79 |
| 6,093,122 | A * | 7/2000 | McLaughlin | B62M 9/1248 474/80 |
| 6,923,740 | B2 * | 8/2005 | Nanko | B62M 9/1342 474/78 |
| 7,722,486 | B2 * | 5/2010 | Nanko | B62M 9/136 474/103 |
| 7,914,407 | B2 * | 3/2011 | Fukushima | B62M 9/1344 474/80 |
| 8,337,343 | B2 * | 12/2012 | Lin | F16H 7/22 474/78 |
| 8,419,573 | B2 * | 4/2013 | Yamaguchi | B62M 9/1242 267/155 |
| 8,663,043 | B2 * | 3/2014 | Auer | B62M 9/137 474/82 |
| 8,777,788 | B2 * | 7/2014 | Kawakami | B62M 9/1344 474/80 |
| 9,156,524 | B2 * | 10/2015 | Emura | B62M 9/1242 |
| 9,156,525 | B2 * | 10/2015 | Emura | B62M 9/135 |
| 9,248,885 | B2 * | 2/2016 | Emura | B62M 9/1242 |
| 9,334,018 | B2 * | 5/2016 | Emura | B62M 9/1342 |
| 9,499,232 | B2 * | 11/2016 | Emura | B62M 9/135 |
| 2014/0349793 | A1 * | 11/2014 | Emura | B62M 9/134 474/80 |
| 2015/0018146 | A1 * | 1/2015 | Emura | B62M 9/1342 474/80 |

FOREIGN PATENT DOCUMENTS

| | | |
|---|---|---|
| EP | 0042274 | 12/1981 |
| EP | 0104110 | 3/1984 |
| EP | 1314636 A2 | 5/2003 |
| JP | S5757194 U | 4/1982 |

* cited by examiner

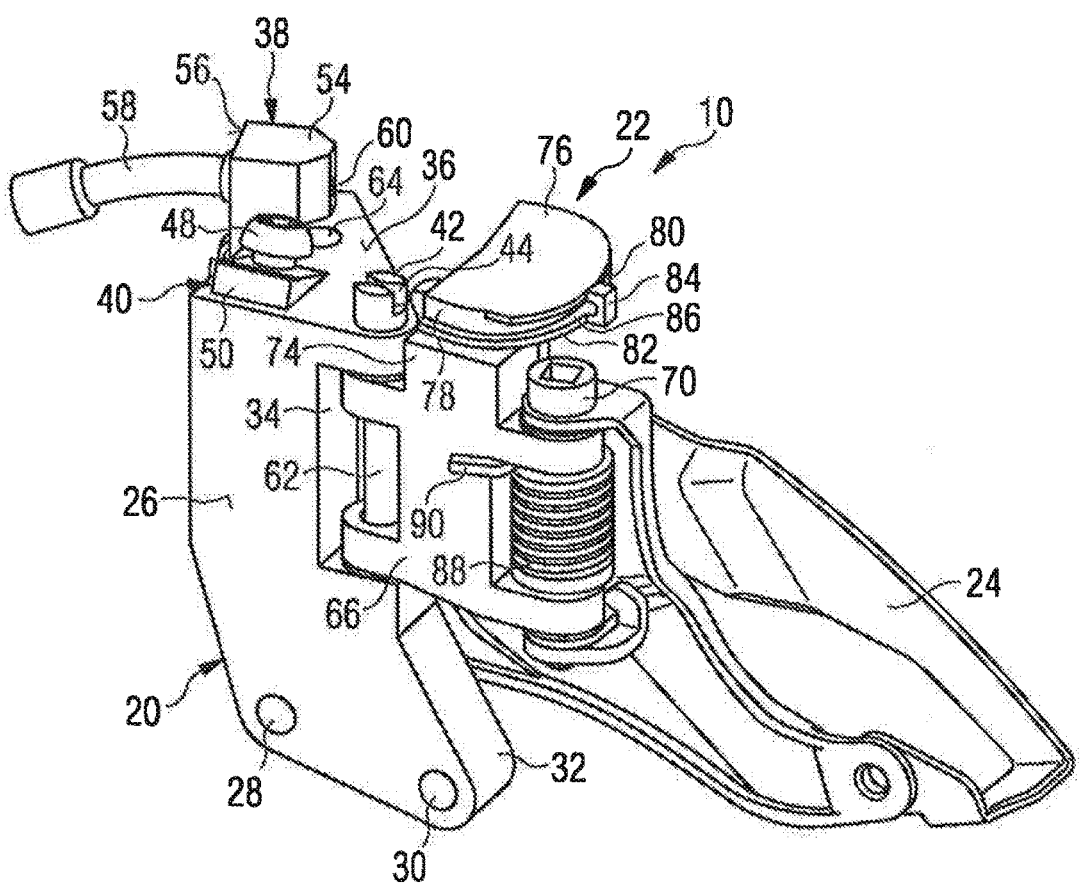

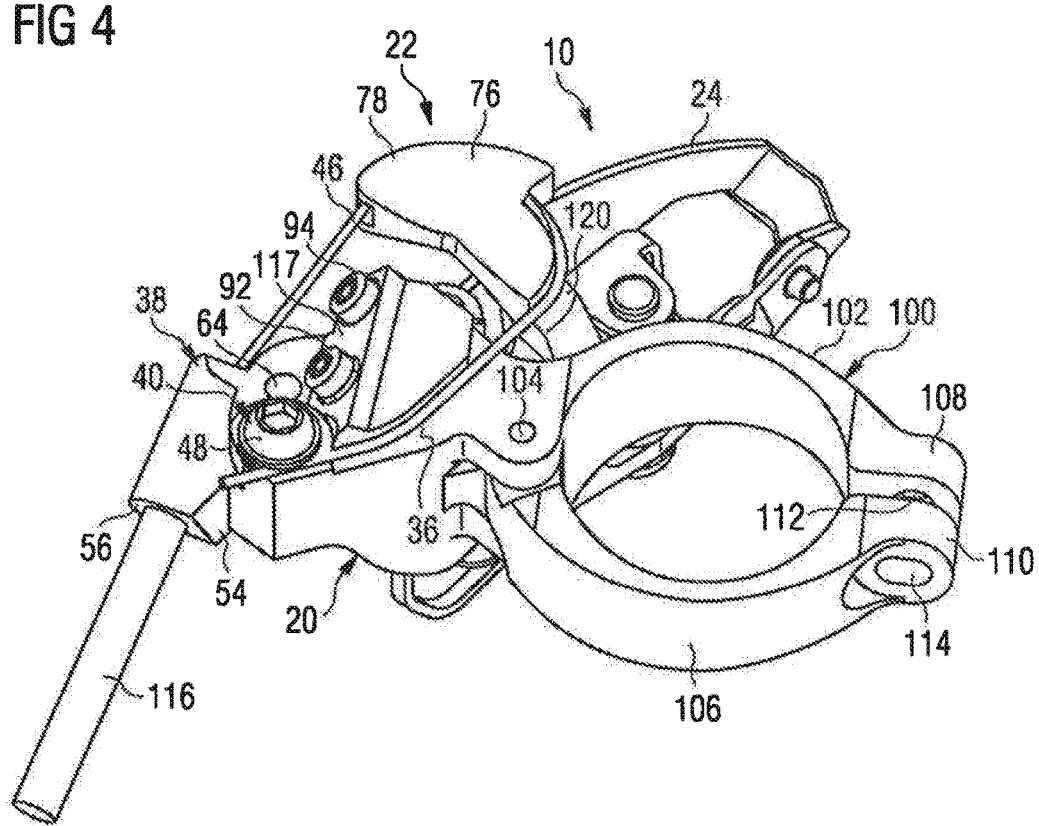

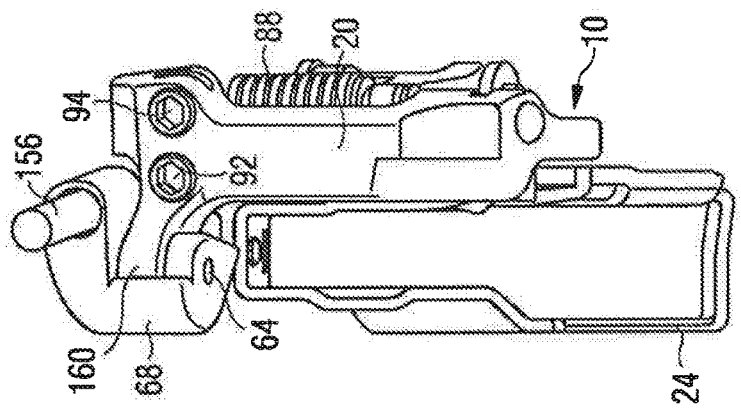
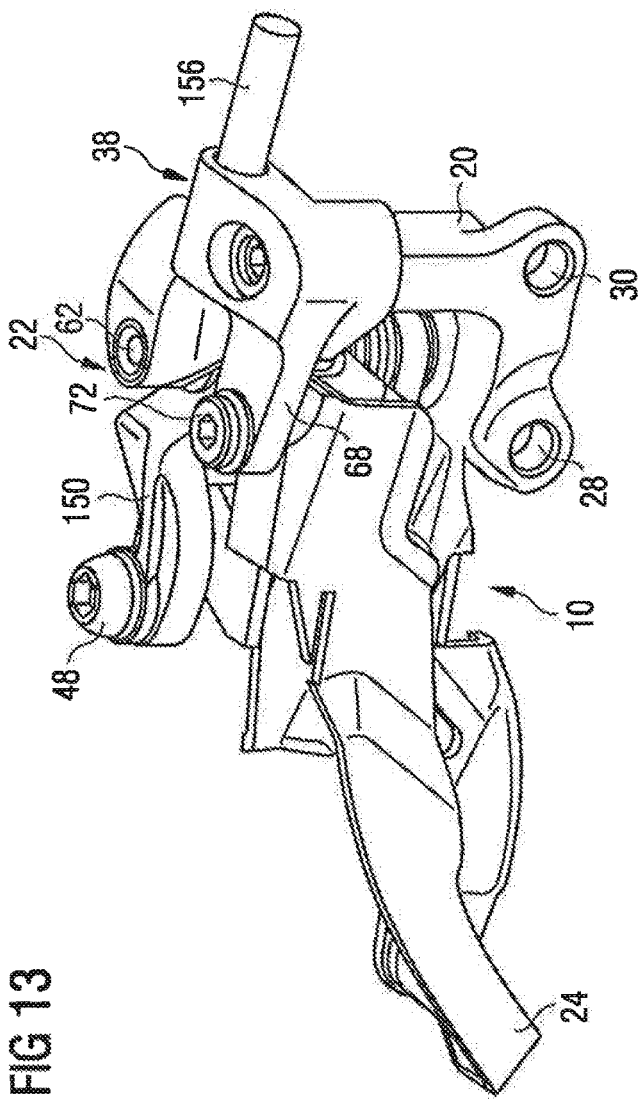

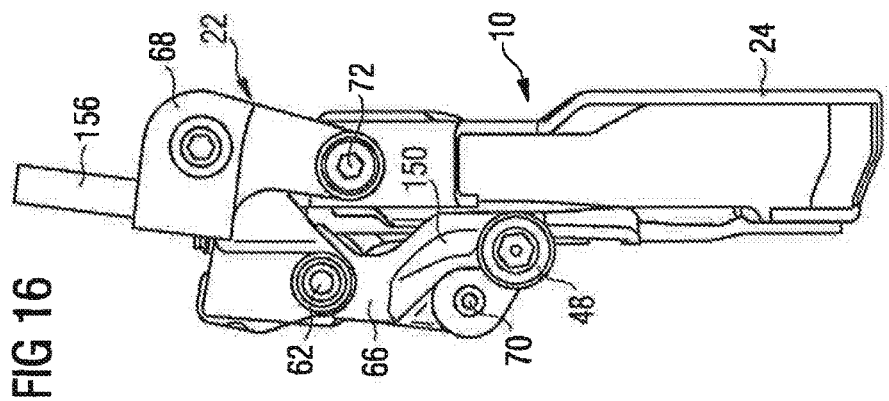
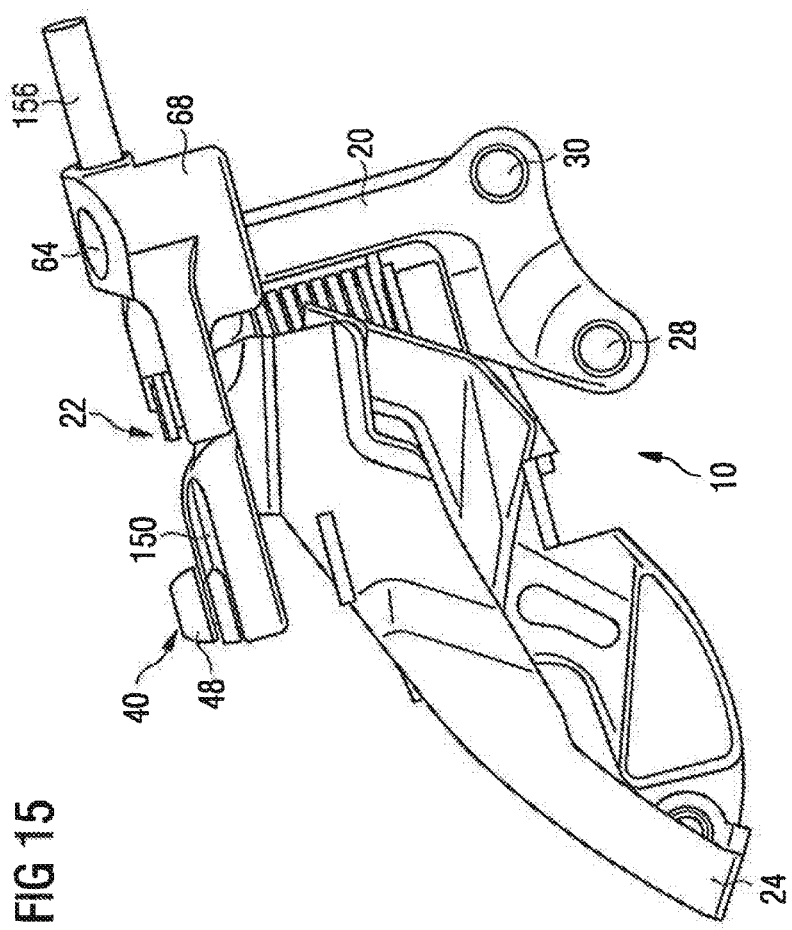

FRONT DERAILLEUR DEVICE FOR A BICYCLE CHAIN SHIFT

This application claims priority to, and/or the benefit of, German patent application DE 10 2015 010311.3, filed Aug. 6, 2016.

FIELD OF THE INVENTION

The invention concerns a front derailleur device for bicycle chain shifting including a frame fixing part for attachment to a bicycle frame.

BACKGROUND

Such front derailleur devices are known from the prior art. For example, documents DE 10 2014 010 367 A1 and DE 10 2014 007 566 A1 describe front derailleur devices of this type. These are configured such that the derailleur device is pretensioned via a spring mechanism in a particular operating position, for example in the operating position of the bicycle chain in which the chain lies on the smallest chain wheel. The chain cage is in a position in which it holds the bicycle chain on the smallest chain wheel. In order to actuate the derailleur device so that the chain cage is pivoted via the hinge arrangement such that the bicycle chain is moved to the next larger chain wheel and as far as the largest chain wheel (insofar as the bicycle chain shift has more than two chain wheels), in such conventional front derailleur devices an actuating force is exerted on the derailleur device via a Bowden cable. This actuating force is sufficiently large to overcome the pretension force and thus causes a displacement of the chain cage into the desired operating position.

One essential aspect of such front derailleur devices lies in the geometric arrangement of the hinge arrangement which is pivotable relative to the frame fixing part. Normally, hinge arrangements are used with two parallel pivotable lever arms, wherein each lever arm is mounted with one end pivotably on the frame fixing part and with its other end pivotably on the chain cage. Overall, this gives a type of parallelogram mechanism so that the chain cage can be moved on an orbit in a predefined alignment. The two documents mentioned above show arrangements in which the chain cage is pivoted sideways in the manner described above in a substantially horizontal plane or in a plane tilted slightly to the horizontal. In this context, we also speak of "side swing" derailleurs.

Such "side swing" derailleur devices have been known for a long time in the prior art, for example from documents EP 0 042 274 A2 or EP 0 104 110 B1.

An essential advantage of such "side swing" derailleur devices is that they can be arranged with their mechanical components substantially to the side of the frame tube. In modern bicycles with frame geometries with short chain struts and large running wheel diameters, relatively little space is available behind the seat tube of the frame. This applies both to the mechanical components of the derailleur device itself and to components for guiding the control cable with which the derailleur device is actuated.

As an alternative to "side swing" derailleur devices, derailleurs are known in which the chain cage pivots in the vertical direction, so-called "top swing" arrangements. Such a front derailleur device is shown and described for example in document U.S. Pat. No. 4,613,319. In this arrangement, the chain cage is pivoted from a bottom position above the smallest chain wheel upward to the largest chain wheel. A similar arrangement is shown and described in document U.S. Pat. No. 4,030,374. This arrangement is also configured as a "top swing" arrangement. This document has the feature that a leaf spring is screwed to one of the hinged struts of the hinge arrangement, protrudes over the hinged strut and rests in a sprung manner on an arm. This solution is also space-consuming and has not therefore proved successful in practice.

An important aspect of modern derailleur devices lies in the inward and outward routing of the control cable. Because of the ever more complex frame geometries, conventional guide routes of the control cable, for example along the seat tube, are often no longer advantageous. It is an object of the present invention to propose a front derailleur device of the type described initially which, with simple and economic construction and reliable function, takes up little construction space and allows an advantageous guidance of the control cable.

SUMMARY AND DESCRIPTION

A front derailleur device with simple and economic construction and reliable function takes up little construction space and allows an advantageous guidance of the control cable is provided in which it is proposed that the control cable can be guided relative to the bicycle frame via a cable guide device provided on the frame fixing part. Furthermore in this embodiment of the invention, it is provided that the control cable can be fixed to the derailleur device via a cable fixing device, preferably by clamping, wherein the cable fixing device is provided on the frame fixing part. In addition, in this embodiment of the invention it may be provided that the control cable is guided between the cable fixing device and the cable guiding device via a cable deflecting device, wherein the cable deflecting device is arranged on one of the hinged struts of the hinge arrangement or on the chain cage.

An embodiment of the derailleur device according to the invention offers the advantage that the components for fixing the control cable and for guiding and routing the control cable can be mounted directly on the frame fixing part. This has the advantage that the control cable can be mounted on the component which, because of its fixing to the bicycle frame, is best able to withstand the forces occurring on mounting and in operation. In addition, because of its fixing function, the frame fixing part can be designed relatively solid. The other components which, in this embodiment of the invention, are not provided for fixing the control cable and for its guidance and routing, can therefore be more easily optimised in terms of weight. A further advantage of this embodiment according to the invention is that the control cable can be guided from the derailleur device in various orientations relative to the frame as required. For this, the guide device provided on the frame fixing part can be adapted to the respective application or be configured movably.

Furthermore, according to an embodiment, a derailleur device of the type described initially can be provided in which the control cable can be guided relative to the bicycle frame via a cable guide device provided on the frame fixing part, and the control cable can be fixed via a cable fixing device, wherein the cable fixing device is provided on the chain cage. In the same way as in the embodiment described above, this embodiment also provides that the frame fixing part is provided with the cable guide device. By deviation from the embodiment described above however, the cable fixing device is provided not on the frame fixing part but on the chain cage. This has the advantage that the cable fixing device can be arranged on the chain cage—which in any case is configured relatively protruding—so that for this no additional construction space need be created on other components. This allows a relatively compact configuration with an advantageous cable routing.

In addition, according to an embodiment a derailleur device of the type described initially may be provided in which the control cable can be guided relative to the bicycle frame via a cable guide device provided on the chain cage, and the control cable can be fixed via a cable fixing device, wherein the cable fixing device is provided on the chain cage or on the frame fixing part. This embodiment of the invention provides that the cable guide device is arranged on the chain cage so that this moves together with the chain cage. Based on the exemplary embodiments outlined above, the cable fixing device can then advantageously be mounted as required on the chain cage or on the frame fixing part, depending on application.

Some embodiments have the corresponding advantage that a derailleur device can be provided which, with functionally optimised compact construction, allows a variable cable routing in relation to the frame as required.

According to an embodiment of the invention, it may furthermore be provided that the cable guide device is arranged on one of the bearing pins and is mounted pivotably therewith relative to the frame fixing part. The bearing pin is mounted movably in its component assigned thereto, i.e. in the frame fixing part or chain cage and the assigned hinged strut, so that the cable guide device attached to the respective bearing pin can be oriented according to the necessary direction of the outbound cable. In other words, this possibility of orienting the cable guide device allows optimal routing of the control cable relative to the frame, in each case depending on the frame geometry.

Regularly and usually, so-called Bowden cables are used as control cables, i.e. arrangements in which a control wire or control cable is guided in a cable sleeve which can be used for force transmission. To fix such a control cable, in particular the control wire guided in the cable sleeve, it may be proposed that the cable fixing device has a fixing bolt which can be screwed into a fixing face, wherein preferably the fixing face is tilted relative to the bicycle longitudinal plane in order to increase the ease of installation. A headed bolt may be used for example as a fixing bolt. The fixing face may for example be provided in the form of a solid, ramp-like protrusion on the respective component of the derailleur device, for example on the frame fixing part or chain cage. A threaded hole may be made in this ramp-like protrusion. The slope of the fixing face is preferably selected, depending on the installation situation, so that the fixing bolt faces the installer for installation and is easily accessible. For example, a slope in the region of 15 to 45 degrees relative to a horizontal plane could be considered.

To increase the clamping effect for fixing the control cable, it may be provided that the cable fixing device has a clamping jaw with which the control cable can be fixed via the fixing bolt. In this way, the control cable can be securely clamped over a relatively long control cable portion.

An embodiment of the invention proposes that the frame fixing part has a cable function face on which the cable fixing device and/or the cable guide device are formed. This embodiment of the invention allows for example the upper face of the frame fixing part to be equipped with measures for cable fixing and cable guidance. This allows a particularly advantageous cable routing between the point at which the control cable is fixed, over a portion on which the control cable acts force-transmissively to actuate the derailleur device, up to the cable guide device where the control cable is connected to or taken from the derailleur device.

With regard to the guidance of the control cable and its connection to the derailleur device, it may furthermore be provided that the cable guide device has a cable sleeve support portion on which a cable sleeve of the control cable rests force-transmissively. In this context, it is possible that the cable sleeve support portion has a passage opening through which a portion of the control cable which protrudes out of the cable sleeve extends. Whereas the cable sleeve rests on the cable sleeve support portion, the control cable extends through the passage opening to further function components of the derailleur device, in particular for force transmission and fixing.

A further essential aspect of modern derailleur devices is to allow as secure a fixing as possible to the bicycle frame. In this context, two alternative embodiments provide that, for fixing to the bicycle frame, the frame fixing part is provided with fixing openings which are arranged substantially above or substantially below a bearing portion for rotatable mounting of one of the hinged struts. It is also possible to arrange the fixing of the frame fixing part either above the mounting of the hinge arrangement in a so-called HDM arrangement (high derailleur mount) or below the mounting of the hinge arrangement in the so-called LDM arrangement (low derailleur mount). This depends on the fixing possibility provided on the respective bicycle frame.

For fine adjustment, it may be provided that—independently of an HDM or LDM arrangement—at least one of the fixing openings is configured as a slot, via which the position of the derailleur device relative to the bicycle frame can be adjusted during fixing. Thus it is possible to fix the derailleur device initially loosely via a fixing opening on the bicycle frame not configured as a slot, and then adjust the definitive position of the derailleur device by shifting this relative to the bicycle frame within the limits of the play provided by the slot.

In an embodiment, it is also possible to provide the derailleur device in the region of its frame fixing part with a clamping device, for example a clamping clip. This embodiment of the invention is used if no particular measures are provided on the bicycle frame for fixing the front derailleur device.

In connection with the design of the frame fixing part, an embodiment of the invention provides that the bearing portion has a recess in which a free end of one of the hinged struts is received pivotably via a bearing pin.

An embodiment provides that the cable deflecting device comprises a deflecting body which has a deflecting curve for guiding and deflecting the control cable. In principle, it is possible to guide the control cable directly from the cable guide device to the cable fixing device, and arrange the cable fixing device on one of the hinged struts or on the chain cage, so that tension forces can be exerted by the control cable directly on a component which is movable relative to the frame fixing part. The return forces are achieved by a spring mechanism. Such an arrangement may not always be advantageous, however, with regard to force transmission and/or cable guidance, so a cable deflection with the cable deflecting device described above is therefore preferred.

In connection with the provision of a cable deflecting device, it may be provided that for guiding the control cable, the deflecting curve is provided with at least one protruding edge portion and/or with a guide tunnel. The provision of at least one protruding edge portion and/or a closed guide tunnel ensures a secure guidance of the control cable and prevents this from slipping undesirably off the deflecting curve or deflecting body in operation. Also, undesirable relative movements between the control cable and the deflecting curve can thus be prevented.

An embodiment proposes that the deflecting curve extends over an angle of at least 90 degrees, preferably over an angle of at least 180 degrees. In this way, a partial or complete direction reversal of the control cable can be achieved. A deflection by approximately 180 degrees is preferably used for example if both the cable fixing device and the cable guide device are arranged on one and the same component, for example on the frame fixing part. Then it may be advantageous, for force transmission, to guide the control cable via a deflecting body arranged on one of the hinged struts or on the chain cage and use this to deflect the control cable through approximately 180 degrees.

Alternatively to an embodiment of the cable deflecting device with a rigid deflecting body, it may be provided that the cable deflecting device has at least one deflecting roller for guiding the control cable. In this context, it may furthermore be provided that the deflecting roller is arranged, preferably rotatably, on the frame fixing part or on one of the hinged struts or on the chain cage.

In addition or alternatively to a deflecting body and/or a deflecting roller, an embodiment provides, in connection with the cable guidance, that for guiding the control cable, a receiver is assigned to at least one bearing pin, wherein the receiver is preferably configured L-shaped with one L arm for unilateral guidance or U-shaped with two opposing U arms for bilateral guidance. Here it is possible to configure a bearing pin with an axial protrusion which for example protrudes in the region of the cable function face, this axial protrusion can then be geometrically formed so that it supports the control cable on one side with one face or it may be provided with a slot profile so that it holds the control cable on both sides. An embodiment here provides that the faces supporting the control cable on one side or both sides are curved, so that if the control cable shifts in its angular position relative to the bearing pin in the different operating positions of the derailleur device, the respective supporting faces also offer flat support for the control cable on a change in angular position of the control cable.

With regard to the embodiment of the hinge arrangement, according to an embodiment it may be provided that a first hinged strut of the hinged struts is configured with a central hinged strut portion and two bearing forks protruding from the central hinged strut portion in opposite directions. In this context, according to the embodiment it is possible that the bearing forks are substantially aligned to each other, so that the first hinged strut of the hinged struts is configured substantially H-shaped, wherein the deflecting body or the deflecting roller is arranged on a central protrusion of the hinged strut. Alternatively, according to an embodiment it may also be proposed that the bearing forks are arranged offset to each other in the vertical direction on the central hinged strut portion.

Furthermore, in connection with the embodiment of the hinge arrangement, a first hinged strut of the hinged struts is configured with an arm on which the deflecting body or the deflecting roller is arranged.

In order to achieve a pretension force which pretensions the derailleur device in a predefined operating position, wherein following actuation of the control cable, a shift of the chain cage of the derailleur device is provided by a pivoting of the hinge arrangement against the pretension force. It may furthermore be provided that a torsion spring is assigned to at least one bearing pin and pretensions the hinge arrangement in a predefined position. In this embodiment variant, the torsion spring may for example be guided around the respective bearing pin in the manner of a coil spring and rest with one end on the hinged strut and with its other end on the frame fixing part or on the chain cage. In this way, a torsional pretension force can be achieved. The torsion spring may already be pretensioned in the predefined operating position or only move out of this predefined operating position on deflection under torsion stress. In both cases, the torsion spring has a reset effect.

In addition, or alternatively, to the provision of a torsion spring, it may be provided that at least one of the hinged struts is formed at least in portions by a leaf spring which pretensions the hinge arrangement in a predefined position.

It has been shown that it is not necessary to configure the hinged struts of the hinge arrangement completely rigidly and provide additional spring elements such as coil springs or an additional leaf spring. Instead, the inventors have also found that for application of the spring forces necessary for operation, it is possible to configure at least one of the hinged struts at least in portions as a spring element, so that this—effectively without additional components and hence space-savingly—integrally itself provides the spring forces necessary for operation of the derailleur device and also has guidance properties. In this way, construction space can be saved which would have to be provided in conventional derailleur devices for additional spring elements such as coil springs or leaf springs. Furthermore, the design of the derailleur device can thus be substantially simplified because suspension regions or attachment portions for additional spring elements can be omitted. Furthermore, the susceptibility to wear and the possibility for cleaning such derailleur devices are improved by embodiments of the invention.

The leaf spring may be made of a spring steel, a composite material or an organic material. Its properties with regard to elasticity, fatigue strength and service life are decisive for selection of a suitable material. The leaf spring may be fixedly clamped at least with one end to the frame fixing part or to the chain cage via a clamping bearing. In addition, or alternatively, it is possible that the clamping bearing has a clamping element with which the leaf spring can be fixed in the clamping bearing over a clamping length An embodiment provides that the hinge arrangement has two hinged struts, each of which is formed at least in portions by a leaf spring, wherein the first hinged strut is fixedly clamped with its one end to the frame fixing part via a clamping bearing and with its other end is mounted pivotably on the chain cage, and wherein the second hinged strut is mounted pivotably on the frame fixing part with its one end and with its other end is fixedly clamped to the chain cage. In other words, in this embodiment, the two hinged struts are formed at least in part by a leaf spring and are mounted alternately on the chain cage and frame fixing part. This utilizes the elastic deformation of the hinged struts, formed at least in portions as leaf springs, at the clamping bearing assigned to the frame fixing part and at the clamping bearing assigned to the chain cage, in order to achieve the (pre)tension force.

Furthermore, in connection with this embodiment of the invention, it may be proposed to clamp both hinged struts fixedly at both ends. This may be achieved via a clamping bearing of the type described above. Alternatively to a fixed clamping at both ends of each of the hinged struts, a fixed clamping of the leaf springs may be provided at only one end.

An embodiment provides that a rotatably mounted deflecting bolt is provided between the frame fixing part and the chain cage, on which bolt at least one of the leaf springs rests in the case of deformation.

An embodiment proposes that the derailleur device has at least one, preferably two adjustment screws, wherein the position of the chain cage may be selected depending on the selected position of the at least one, preferably two adjustment screws, wherein the longitudinal axis of the at least one, preferably two adjustment screws runs substantially horizontally or is tilted to the horizontal by an angle of 15 degrees to 60 degrees, preferably by an angle of around 45 degrees. In this context too, it should be as simple as possible for a mechanic to access the arrangement of the adjustment bolts, which at the same time allows simple and permanent adjustment of the function of the derailleur device. This setting allows adjustment of the operating positions of the derailleur device, matched to the position of the assigned front chain wheels. According to an embodiment, it is possible that the at least one adjustment screw can be screwed into the frame fixing part or into one of the hinged struts to adjust the position of the chain cage.

As discussed initially, an important aspect of the present invention lies in guiding the control cable advantageously from the derailleur device according to the invention to the bicycle frame. For example, the present invention proposes guiding the control cable, relative to the normal travel direction of the bicycle, away from the derailleur device forward to the bicycle frame. In this connection, according to the invention it may be provided that the cable guide device is configured, in an operating state of the derailleur device mounted on the bicycle, to guide the control cable away from the derailleur towards the bicycle frame, downward relative to the horizontal at an angle of 5 degrees to 45 degrees, preferably at an angle of around 20 degrees. This achieves that the control cable does not disruptively run freely over a long portion, without connection to the frame, away from the derailleur device.

The invention is explained below as an example with reference to the enclosed drawings.

BRIEF DESCRIPTION OF THE DRAWINGS

FIG. 1 is a perspective view of a front derailleur device of a first embodiment of the invention;

FIG. 4 is a perspective view from an oblique, top viewing angle of a front derailleur device according to a second embodiment of the invention;

FIG. 13 is a perspective view of the front derailleur device according to a sixth embodiment of the invention;

FIG. 14 is a front view of the front derailleur device according to the sixth embodiment of the invention;

FIG. 15 is a side view of the front derailleur device according to the sixth embodiment of the invention;

FIG. 16 is a top view of the front derailleur device according to the sixth embodiment of the invention;

DETAILED DESCRIPTION OF THE DRAWINGS

Figure 22:
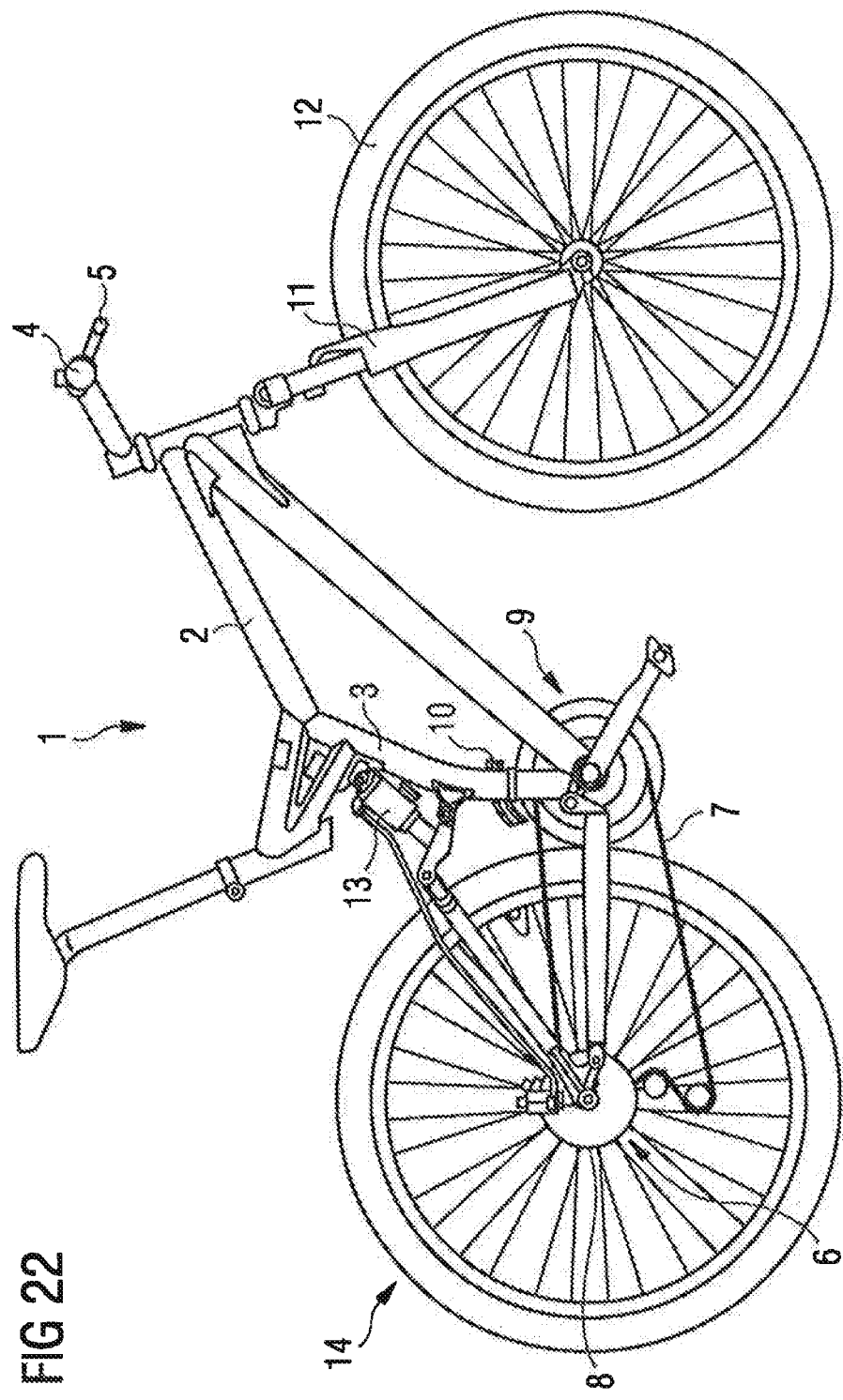
FIG. 22 is a diagrammatic depiction of a bicycle to explain the installation situation of a front derailleur device according to the invention.

FIG. 22 shows diagrammatically a bicycle of the mountain bike type, generally designated with numeral 1. The bicycle has a frame 2 with a seat tube 3. Furthermore, a handlebar 4 is provided on the frame, with actuation devices 5 via which both a braking arrangement (not shown in detail) and also a bicycle chain shift can be actuated. In the known fashion, the bicycle chain shift has a rear shift mechanism 6 via which a chain 7 can be moved on a rear pinion set 8. Furthermore, a front chain wheel arrangement 9 is provided, in this exemplary case with three chain wheels, wherein the chain 7 can be shifted between the chain wheels via a front derailleur device 10. Moreover, a suspension fork 11 can be seen in which a front wheel 12 is spring-mounted. In addition, a rear wheel arrangement 14 can be seen which is spring-mounted via a damper 13.

The present invention concerns the front derailleur device 10, which is merely indicated in FIG. 22. It is however evident that because of the spring-mounted rear wheel arrangement 14 and because of the complex frame geometry in such bicycles, particular attention is paid to the structure of the front derailleur device 10.

FIG. 1 shows a derailleur device according to the invention in a first exemplary embodiment, designated generally with 10. The front derailleur device 10 comprises a solid frame fixing part 20 which is provided for fixing to a bicycle frame. A hinge arrangement 22 is pivotably mounted on the frame fixing part 20, and a chain cage 24 is pivotably mounted on the region of said arrangement facing away from the frame fixing part 20. The chain cage 24 serves for guidance and shifting of the bicycle chain 7.

The frame fixing part 20 has a fixing face 26 which faces a mounting surface of the bicycle frame in the region of seat tube 3 and with which the frame fixing part 20 can be arranged on the bicycle frame. Furthermore, fixing openings 28, 30 are arranged in the frame fixing part 20 in a lower tab-like region 32 of the frame fixing part. In the embodiment shown in FIGS. 1 to 3, this lower tab-like region 32 extends below a recess 34 of the frame fixing part 20. The recess 34 serves for mounting of part of the hinge arrangement 22 which will be described in more detail below. The lower tab-like region 32 is angled forward relative to the upper portion of the frame fixing part 20, for example through an angle of 30 degrees. This allows an advantageous arrangement of the two fixing openings 28, 30 through which fixing bolts (not shown) can be inserted for attachment to the bicycle frame.

In its upper region above the recess 34, the frame fixing part 20 has a cable function face 36. A cable guide device 38 and a cable fixing device 40 are provided thereon. In addition, a peg-like protrusion 42 is provided on the cable function face 36 and has a slot in its upper end to form a guide channel 44. The guide channel widens slightly at both ends and has its smallest clear width in its middle region.

In addition to the components described above, FIGS. 2 and 3 also show a control cable 46. The control cable 46 is fixedly clamped at the cable fixing device 40 via a fixing bolt 48. For this, the fixing bolt 48 is screwed into a threaded bore which is formed in a solid ramp 50, wherein the ramp 50 is configured integrally with the frame fixing part 20. More precisely, the threaded bore for receiving the fixing bolt 48 starts from a fixing face 52 tilted by around 30 degrees to the cable function face 36, and extends into the material of the frame fixing part 20. The sloping fixing face 52 allows the fixing bolt 48 to be screwed in easily on installation.

Figure 3:
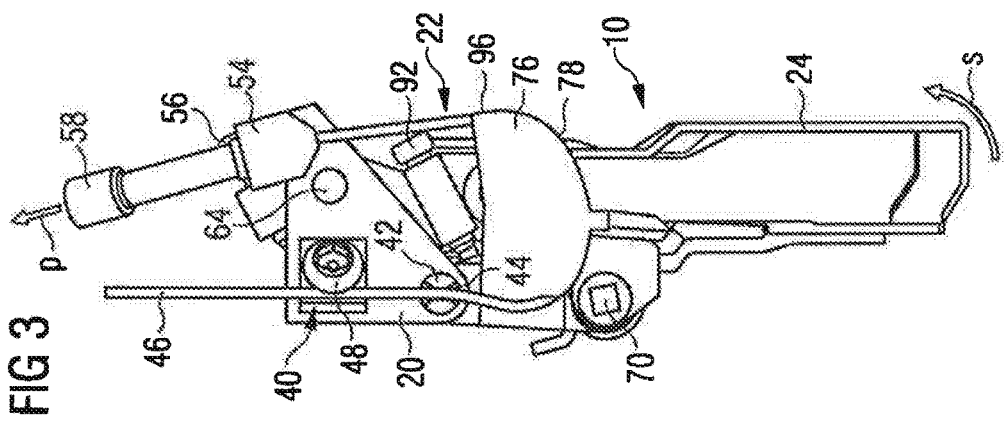
FIG. 3 is a top view of the front derailleur device according to the first embodiment of the invention.
Figure 2:
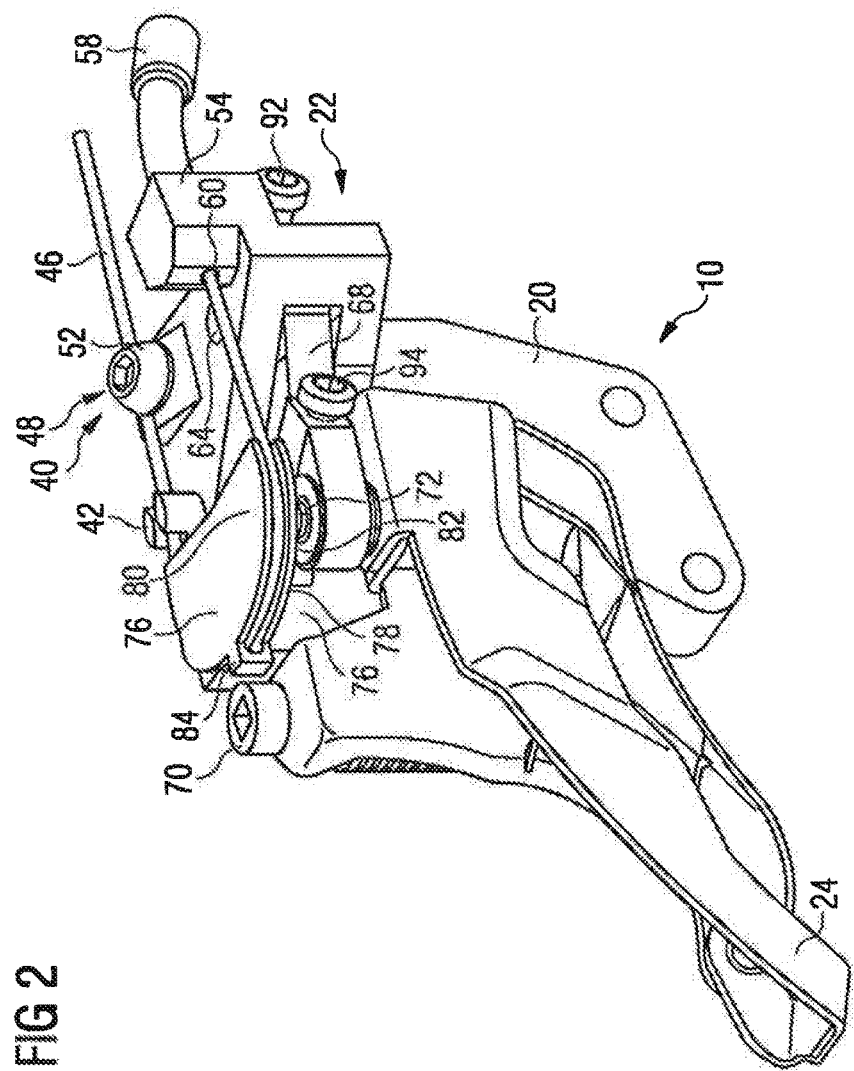
FIG. 2 is a perspective view of the front derailleur device according to the first embodiment of the invention from another viewing angle and with the control cable marked.

Furthermore, FIGS. 1 to 3 show that the cable guide device 38 is formed integrally on the frame fixing part 20 in the form of an upward extending protrusion 54. On its front side 56 pointing forward in the installation position, the protrusion 54 has a support face on which a cable sleeve connector 58 of the control cable 46 can rest force-transmissively. For this, a depression receiving the end of the cable sleeve connector 58 substantially by form fit may be configured on the front side 56. Instead of the cable sleeve connector 58, it is also possible to guide the cable sleeve of the control cable 46 directly at the protrusion 54. A passage bore 60 is provided in the protrusion 54 through which the control cable 46 is guided.

FIG. 3 shows a top view of the peg-like protrusion 42 with its guide channel 44. It is evident that the guide channel 44 widens at the ends in the direction of extension of the control cable 46 and has its smallest clear width in its middle region, corresponding substantially to the diameter of the control cable 46.

Two hinged struts 66, 68 are mounted on the frame fixing part 20, pivotably relative to the frame fixing part 20 via bearing pins 62, 64, firstly inside the recess 34 and secondly in a region close to the protrusion 54. The bearing pins 62, 64 are here received securely but pivotably in the frame fixing part 20. The peg-like protrusion 42 is formed on the upper end of the bearing pins 62. The hinged struts 66, 68 are mounted at their respective end portions facing away from the frame fixing part 20 pivotably on the chain cage 24. Here again, further bearing pins are provided, namely bearing pin 70 between the chain cage 24 and the hinged strut 66, and bearing pin 72 between the hinged strut 68 and the chain cage 24. The hinged struts 66, 68 together with the frame fixing part 20 and the chain cage 24, via the bearing pins 62, 64, 70, 72, form a lever mechanism configured as a parallelogram which allows the chain cage 24 to pivot substantially vertically relative to the frame fixing part 20, i.e. to the side without a height difference. The axes of the bearing pins 62, 64, 70, 72 run substantially parallel to each other and, in mounted state of the derailleur device 10, substantially in the vertical direction or tilted by maximum 15 degrees thereto.

It is evident that the hinged strut 66 is configured with an H-shaped profile, from the central middle region of which a protrusion 74 extends upward. A deflecting body 76 is provided on this protrusion 74. The deflecting body 76 has a deflecting curve 78 which extends over approximately 180 degrees around the deflecting body 76 on its outer peripheral face. A rib-like protrusion 80, 82 is provided at each of the upper and lower edges of the deflecting body 76 in FIGS. 1 and 2 along the deflecting curve 78, wherein these protrusions 80, 82 between them form a guide slot. At the apex of the deflecting curve 78, a further guide protrusion 84 is provided with a closed cable passage 86.

It is clear from FIGS. 2 and 3 how the control cable 46 is guided around the deflecting body 76 along the deflecting curve 78. In particular, the control cable 46 is guided starting from its fixing at the cable fixing device 40 via the channel 44 in the peg-like protrusion 42 which forms part of the cable deflecting device, and is deflected over slightly more than 180 degrees around the deflecting body 76 along the deflecting curve 78 and through the cable passage 86, up to the protrusion 54 of the cable guide device.

It is further evident from FIG. 1 that a coil torsion spring 88 is guided around the bearing pin 70 and with its upper spring end 90 rests on the central region of the H-shaped hinged strut 66, and in a manner not shown rests with its lower end on the function face of the chain cage 24 provided for this. In the state shown in FIGS. 1 to 3, the torsion spring 88 is already pretensioned and pretensions the chain cage in the position shown.

In addition, FIGS. 2 and 3 show in particular the adjustment screws 92 and 94 which serve for fine adjustment of the respective operating positions of the derailleur device 10. The adjustment screws 92 and 94 are screwed into assigned threaded bores in the hinged strut 68 and rest with their free ends on the frame fixing part 20, depending on the operating position.

It should be noted that the chain cage 24 is constructed in the known fashion from several pieces, from bent parts which are connected together by riveting or other connecting means.

The function of the front derailleur device according to FIGS. 1-3 is as follows:

Starting from the starting position shown in FIGS. 1-3, in which the chain cage is pretensioned by the pretension of the torsion spring 88, by application of a tensile force on the control cable 46 according to arrow P, a shift of the chain cage can be achieved within the limits of a pivot movement along the arrow direction. This is achieved since a corresponding tensile force acts via the deflecting body 76 in the form of a lever force at point 96. This lever force causes a pivoting of the hinged strut 66 about the bearing pin 62, and necessarily via the chain cage 24 forces a pivoting of the hinged strut 68 about the bearing pin 64. Consequently, the chain cage 24 pivots along arrow S, whereby the chain guided by the chain cage 24 can be shifted sideways. In this way, the chain can be shifted between different chain wheels of the chain wheel arrangement 9 (see FIGS. 2 and 20).

On such pivoting, as the pivot increases, an additional clamping force is built up in the torsion spring 88. When the control cable 46 is released again, under pretension and under the effort of the torsion spring 88 to relax, the hinge arrangement 22 moves back in the direction of its starting position. Via a suitable lock mechanism, in particular on the assigned actuation device 5 (see FIG. 22), the chain cage is held in the desired operating positions assigned to the respective chain wheels until a new actuation takes place.

The configuration according to the embodiment shown in FIGS. 1 to 3 has the advantage that both the cable guide device 38 and the cable fixing device 40 are mounted compactly on the frame fixing part 20. In this way, the components which are exposed in operation to increased actuation forces and clamping forces are provided on the relatively solidly formed frame fixing part 20. In addition, this design allows an advantageous routing of the control cable 46 forward via the cable sleeve connector 58. Depending on the design of the protrusion 54, here different angular alignments can be achieved for routing the control cable 46 or cable sleeve connector 58.

Figure 5:
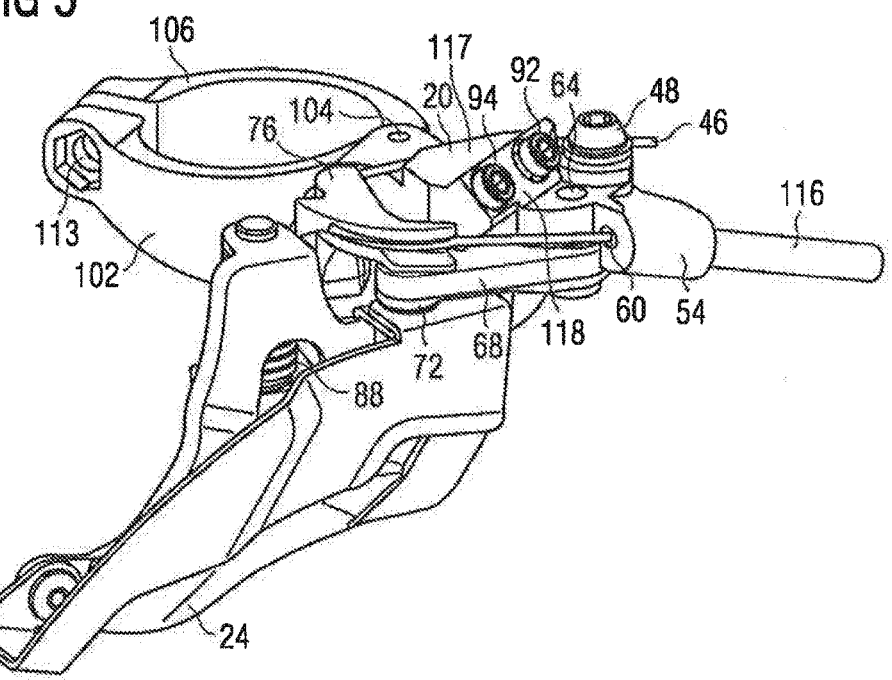
FIG. 5 is a perspective view of the front derailleur device according to the second embodiment of the invention from an oblique, side viewing angle.
Figure 6:
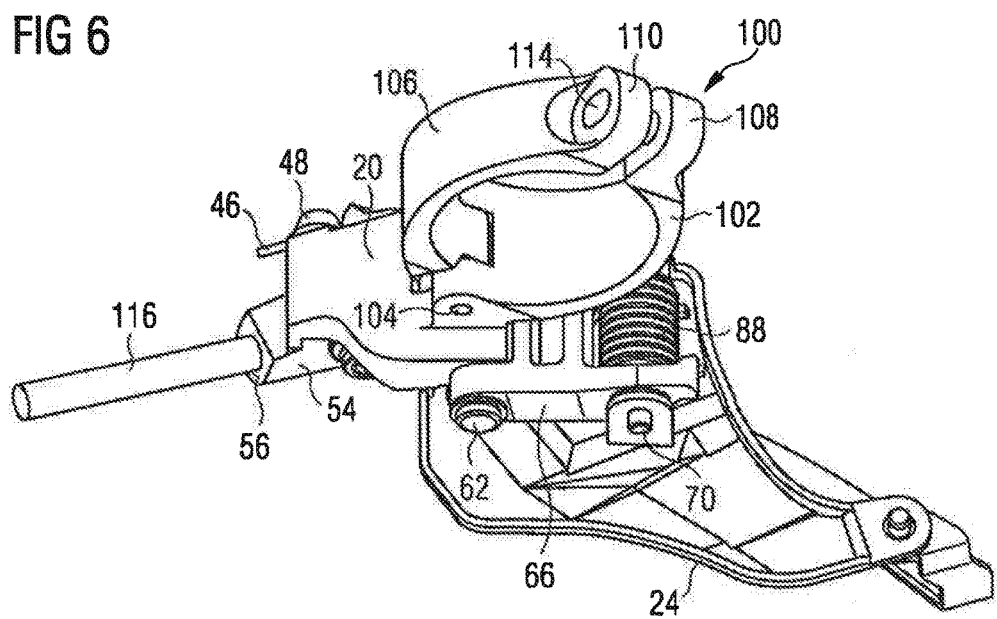
FIG. 6 is a perspective view of the front derailleur device according to the second embodiment of the invention from an oblique, bottom viewing angle.

FIGS. 4 to 6 show a second embodiment of the invention which in structure is similar to the first exemplary embodiment of the invention. To avoid repetition, only the differences are described below, wherein the previous reference numerals are used where applicable.

One essential difference from the first embodiment of the invention is that the frame fixing part 20 is provided with a clamp 100 which serves for fixing the front derailleur device 10 to the seat tube 3 of the bicycle 1. The clamp 100 has a first clamp portion 102 formed on the frame fixing part 20, and a second clamp portion 106 mounted movably pivoting thereto via a bearing journal 104. The two clamp portions 102 and 104 have fixing portions 108 and 110 facing each other, wherein a passage bore 112 with a hexagonal receiver 113 for receiving a nut (FIG. 5) is provided in the fixing portion 108, and wherein furthermore a slot 114 is provided in the fixing portion 110. The slot 114 serves for receiving a clamping bolt (not shown) which can be screwed into a nut (not shown) which can be inserted untwistably in the hexagonal receiver 113.

In the embodiment according to FIGS. 4 to 6 again, both the cable fixing device 40 with the fixing bolt 48 and the cable guide device 38 with a lateral protrusion 54 are provided on the frame fixing part. However in this arrangement, the fixing bolt 48 is screwed directly into the top of the frame fixing part 20 formed as the cable function face 36. The protrusion 54 does not extend upward from this cable function face 36, but obliquely downward from the frame fixing part and to the side, as evident in particular from FIGS. 5 and 6. In addition, the control cable 46 rests directly with its cable sleeve 116 force-transmissively on the front side 56.

Furthermore, it is clear that the two adjustment bolts 92, 94 are screwed into a protrusion 117 with an obliquely oriented face 118 on the frame fixing part 20. These cooperate, in a manner not shown, with the hinged strut 66 for adjustment.

The hinged strut 66 is again formed H-shaped and receives the torsion spring 88 arranged around the bearing pin 70 in the region of the mounting of the chain cage 24, as shown in particular in FIG. 6. The other hinged strut 68 of the hinge arrangement 22 has an arm 120 on which the deflecting body 76 with its deflecting curve 78 is formed integrally. Again, the deflecting body 76 is configured so that it guides the control cable 46 through more than 180 degrees starting from the cable fixing device 40, and conducts it to the cable guide device 38. It is noted that the protrusion 117 with its back also guides the control cable 46.

This arrangement also has the advantage of a compact configuration, wherein the components which are under particular load in operation are provided on the relatively solidly formed frame fixing part.

Figure 7:
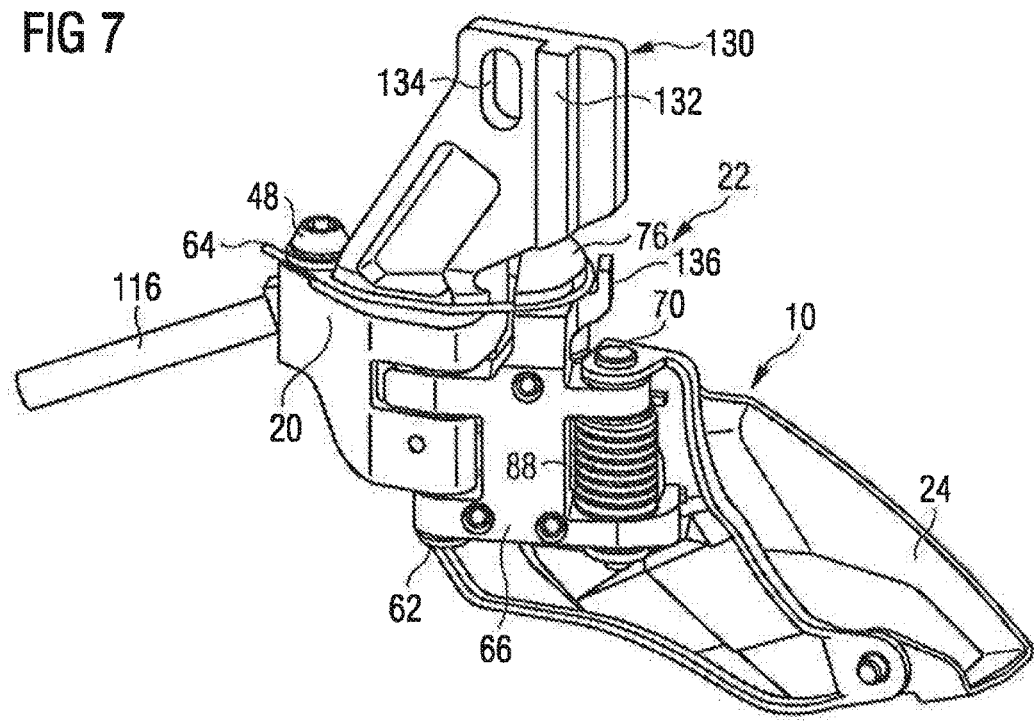
FIG. 7 is a perspective view from an oblique, top viewing angle of a front derailleur device according to a third embodiment of the invention.

The embodiment in FIG. 7 is similar to the embodiment in FIGS. 4 to 6, wherein the clamp 100 has been omitted and instead, on the frame fixing part 20 above the hinge arrangement 22, a tab-like protrusion 130 is arranged which is designed for fixing to a corresponding bracket on the bicycle frame. Again, where applicable the same reference numerals as above are used.

The protrusion 130 has a profile strip 132 extending towards the frame, which engages substantially by form fit in a correspondingly shaped recess on the frame. For fixing to the frame, a fixing bolt (not shown) may be inserted in a slot 134 and fixed in a corresponding threaded bore or via a nut on the frame. The slot 134 allows a degree of vertical play for adjusting the position of the derailleur device 10 on the frame.

The configuration of the hinged strut 66 corresponds substantially to the configuration of the hinged strut 66 in the exemplary embodiment according to FIGS. 1 to 3, wherein the deflecting body 76 is formed above the central region of the H-shaped hinged strut 66 and formed integrally thereon. Furthermore, it can be seen that a guide protrusion 136, open at the top, is provided on the hinge body. The protrusion 130 is formed on the frame fixing part 20 such that its contour serves as an additional guide for the control cable 46.

Figure 8:
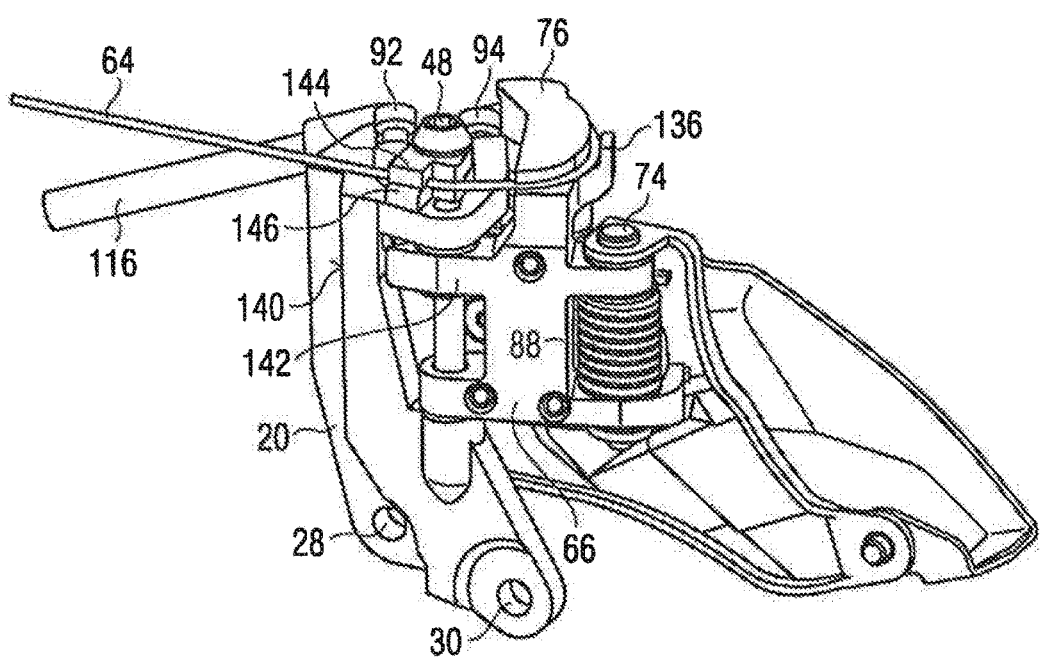
FIG. 8 is a perspective view of the front derailleur device according to a fourth embodiment of the invention from an oblique, side viewing angle.
Figure 10:
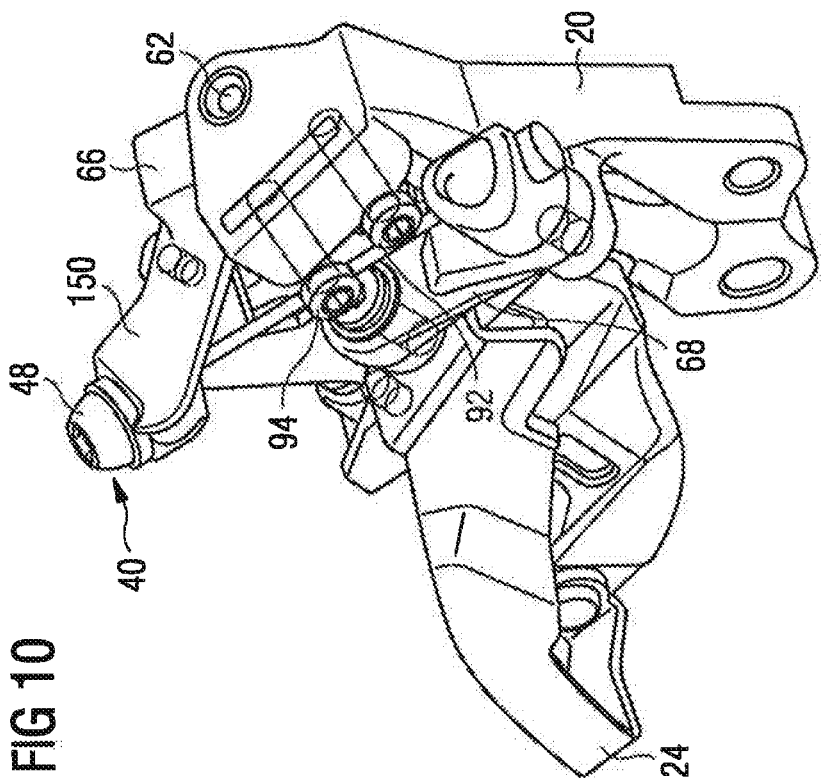
FIG. 10 is a further perspective view of the front derailleur device according to the fifth embodiment of the invention from another viewing angle.
Figure 9:
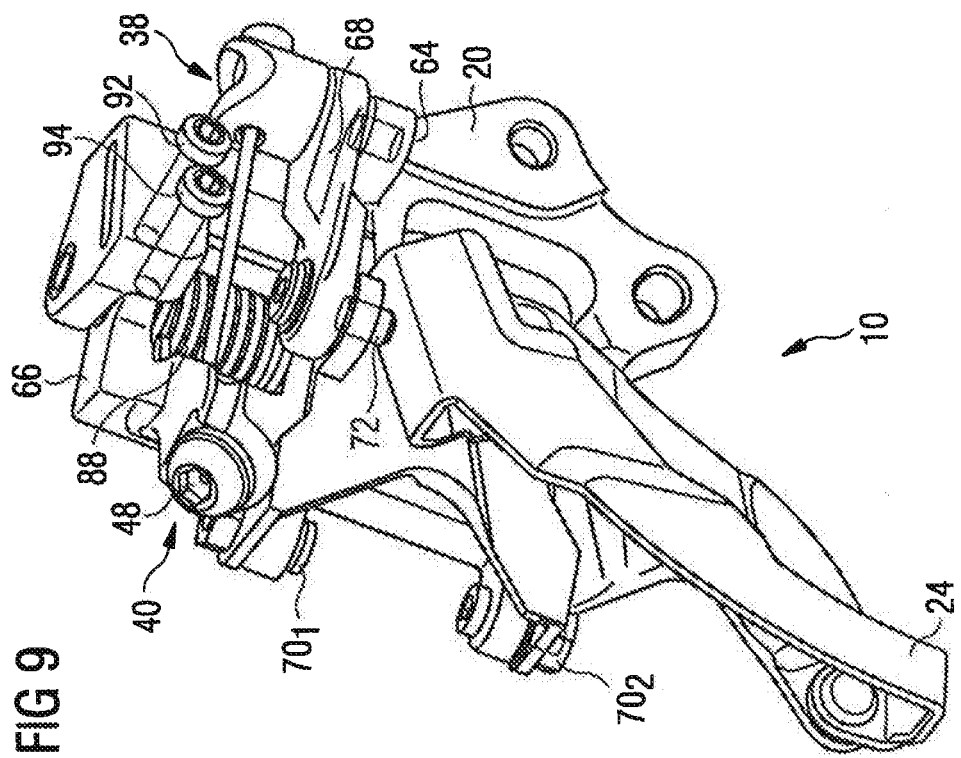
FIG. 9 is a perspective view of the front derailleur device according to a fifth embodiment of the invention.
Figure 11:
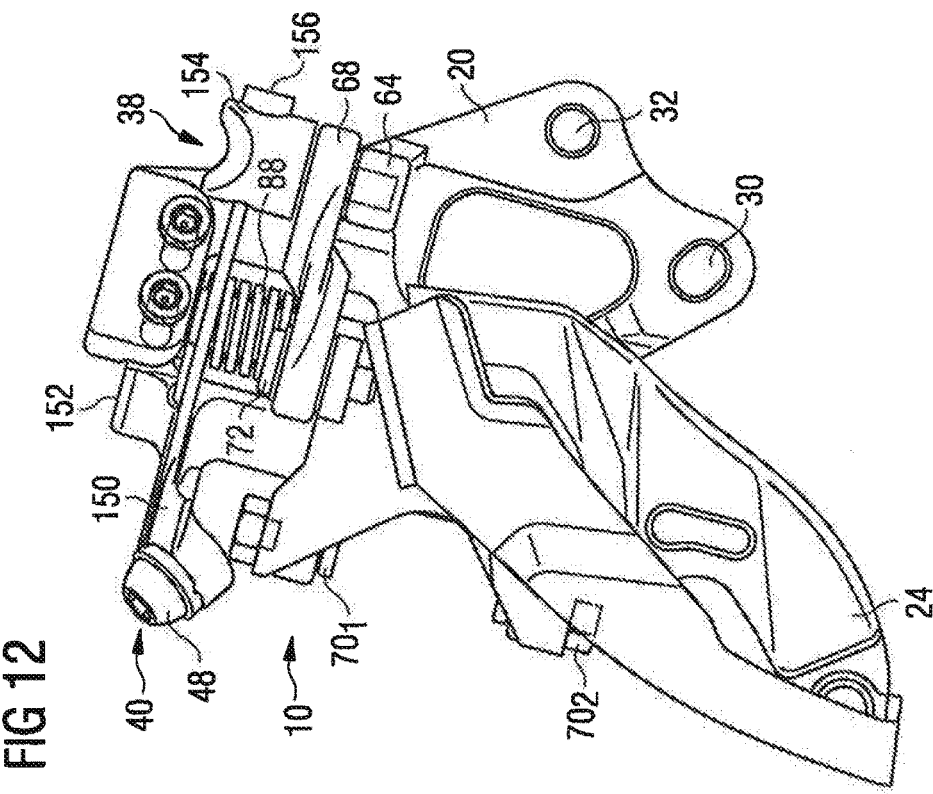
FIG. 11 is a top view of the front derailleur device according to the fifth embodiment of the invention.
Figure 12:
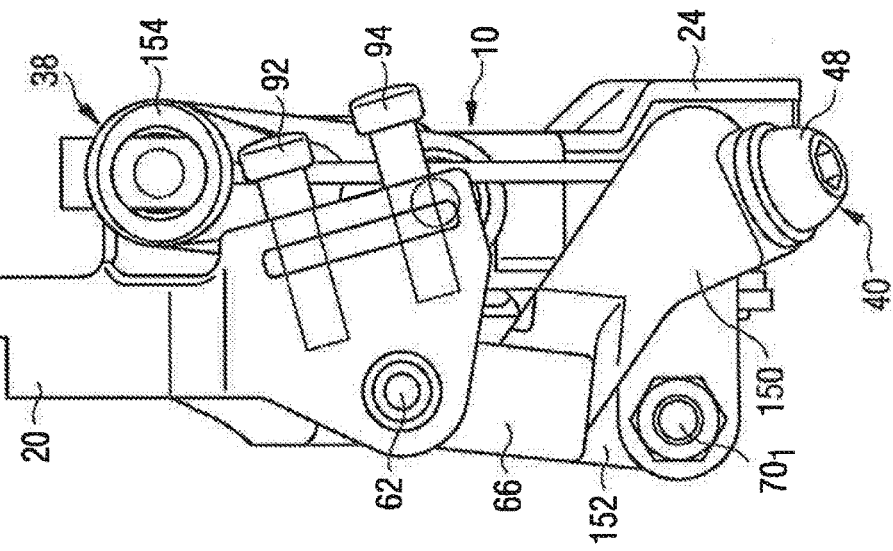
FIG. 12 is a side view of the front derailleur device according to the fifth embodiment of the invention.

FIG. 8 shows an arrangement of a further embodiment according to the invention, similar to the design in FIG. 7, in which, based on the embodiment in FIGS. 1 to 3, the frame fixing part 20 is fixed to the bicycle frame via two openings 28, 30. However in contrast to the embodiment in FIGS. 1 to 3, these lie in different planes. In the embodiment shown in FIG. 7, the frame fixing part 20 is provided with a profile step 140, wherein a bracket is provided for fixing to the bicycle frame and has a corresponding, complementary profile step which can be brought into form fit engagement with the profile step 140.

Furthermore in the embodiment according to FIG. 8, it is seen that the hinged strut 66 is again formed H-shaped. The upper H leg 142 is slightly elongated in the left region and has sloping faces. They serve as contact faces for the two adjustment screws 92, 94. It is also clear that an additional clamping part 144 can be clamped via the fixing bolts 48 on a clamping protrusion 146 for clamping the cable. The clamping part 144 furthermore serves for targeted cable guidance from the clamping point to the deflecting body 76, as can be seen from the cable routing. The deflecting body 76 is again formed integrally on a protrusion 74 of the hinged strut 66.

The cable guidance corresponds substantially to the cable guidance as described with reference to the embodiments in FIGS. 4 to 6 and according to FIG. 7. In this embodiment according to FIG. 8, again the components for cable fixing and cable guidance are each mounted on the frame fixing part 20. Actuation takes place in the manner described via the lever forces acting on the deflecting body 76.

The embodiment shown in FIGS. 9 to 12 differs from the embodiments described above substantially in the arrangement of the cable fixing device 40 and the cable guide device 38. In this embodiment, the cable fixing device 40 is arranged on an arm 150 on the hinged strut 66. This is in turn mounted pivotably on the frame fixing part via the bearing pin 62 and itself mounts the chain cage 24 pivotably via the substantially mutually aligned bearing pins $70_1$ and $70_2$. The hinged strut 66 is again substantially H-shaped but stepped, as shown by the step 152 in FIG. 12. The arm 150 extends below the step 152.

The second hinged strut 68 is also formed stepped and mounted pivotably via the bearing pin 64 relative to the frame fixing part 20. The pivotable mounting relative to the chain cage 24 is achieved via the bearing pin 72. A further feature of this embodiment compared with the preceding embodiments is that the cable guide device 38 comprises a bush 154, formed integrally with the bearing pin 64 and mounted rotatably therewith relative to the hinged strut 68 and the frame fixing part 20. In this way, it is possible to guide the cable sleeve 156 away from the derailleur 10 in the desired orientation.

The embodiment shown in FIGS. 13 to 16 differs from the embodiment according to FIGS. 9 to 12. Where applicable, the same reference numerals as before are used.

In the embodiment according to FIGS. 13 to 16, the frame fixing part 20 is again provided with two openings 28, 30 for fixing to the bicycle frame. The frame fixing part also carries the two adjustment screws 92, 94 which point forward (see FIG. 14). The cable guide device 38 is however mounted not on the frame fixing part 20 but on the hinged strut 68. As shown in FIG. 14, this surrounds in the manner of a fork a front arm 160 formed on the frame fixing part 20. The portion of the hinged strut 68 surrounding the arm 160 in the manner of a fork is mounted via the bearing pin 64 pivotably relative to the frame fixing part 20. The other hinged strut 66 is mounted via the two bearing pins 62 and 70 pivotably relative to the frame fixing part 20 and the chain cage 24 respectively. The hinged strut 66 has an integrally formed arm 150, at the free end of which the cable fixing device 40 with the cable fixing bolt 48 is arranged. When a tensile force is exerted on the control cable (not shown), this tensile force acts on the rear free end of the arm 150 to which the control cable is fixed, and thus shifts the entire hinge arrangement 22.

Figure 17:
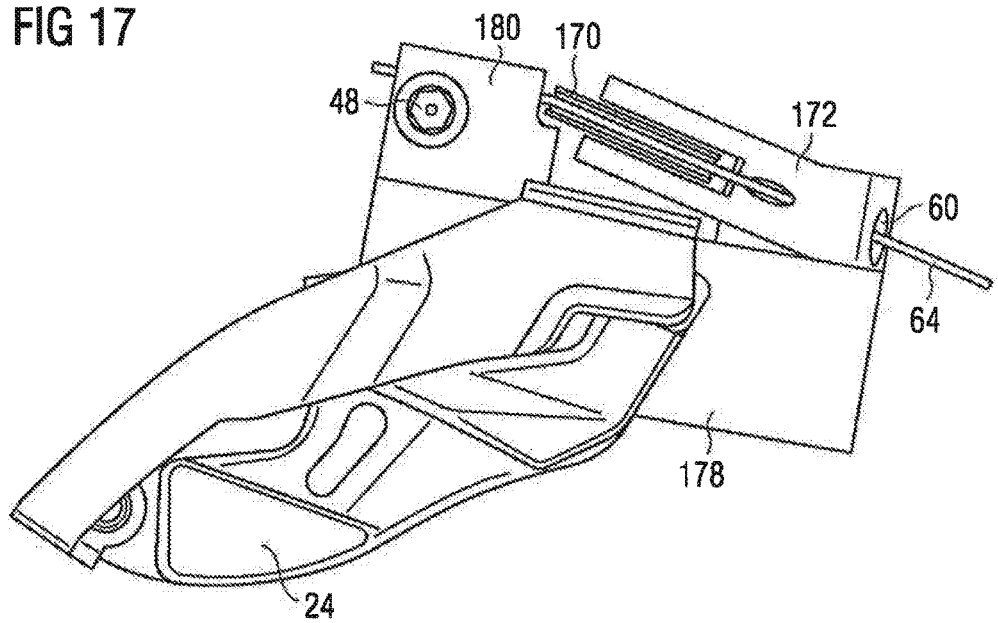
FIG. 17 is a side view of the front derailleur device according to a seventh embodiment of the invention.
Figure 18:
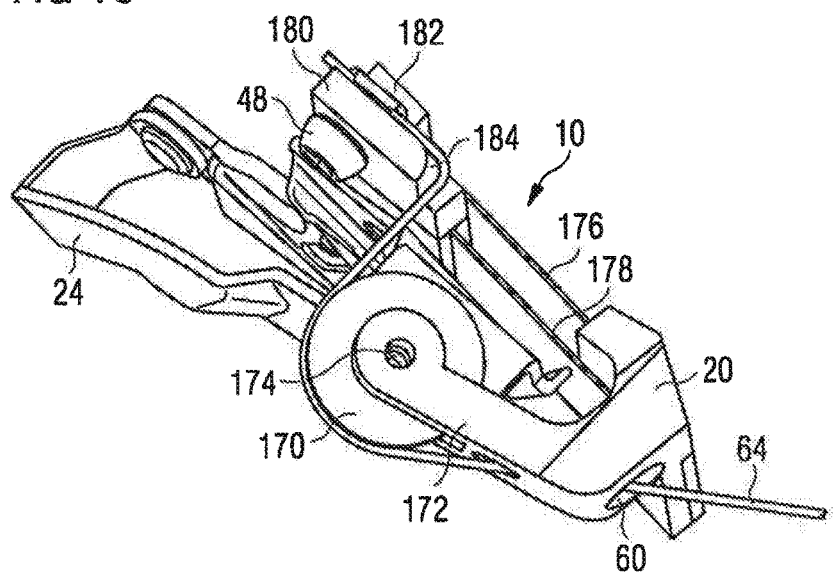
FIG. 18 is a perspective view of the front derailleur device according to the seventh embodiment of the invention.

FIGS. 17 and 18 show a further embodiment of the derailleur device 10 according to the invention. The derailleur device 10 comprises a frame fixing part 20 which is fixedly mountable on the bicycle frame, for example via a clamp (not shown). The frame fixing part 20 is connected via two leaf springs 176, 178 to a pivot part 182 which is pivotable substantially along an arcuate track relative to the frame fixing part. The pivot part 182 is fixedly connected to the chain cage 24 shown in FIGS. 17 and 18. The pivot part 162 has a spatial orientation relative to the frame fixing part 20 which is retained even during pivoting.

The structure of the derailleur device 10 is again such that when the derailleur device 10 is mounted on the bicycle frame, the pivot movement takes place in a substantially horizontal plane along an arcuate track transversely to the bicycle frame.

The two leaf springs 176, 178 are each fixedly clamped at both ends, i.e. each of the leaf springs is arranged with one end fixed to the frame fixing part 20 and the other end fixed to the pivot part 182. Two clamping bearings are provided for this.

The frame fixing part 20 furthermore has a stop face with which the frame fixing part can be brought to rest on a defined counter-stop face (not shown) of the bicycle frame and fixed thereto. Furthermore, the frame fixing part has an L-shaped angled arm 172, at the end of which a fork portion is provided. A deflecting roller 170 is mounted rotatably via a bearing pin 174 in the cavity of the fork portion. The arm 162 has a guide opening 60 through which the control cable 46 is guided. This guide opening terminates in a passage which opens at an outlet orifice facing the deflecting roller 170. The control cable 46 is guided through the passage, via the outlet orifice, to the deflecting roller 170.

A bearing portion 180 is provided on the pivot part 182, to which a clamping tab can be fixed via a clamping screw 48. The bearing portion 180 is provided with a guide rounding 184 and a guide shoulder. The control cable 46 is guided around the deflecting roller 170 towards the bearing portion 180, and to the clamping tab while resting on the guide rounding 184 and the guide shoulder. The control cable 46 is fixed to the bearing portion 180 via the clamping tab and the clamping screw 48.

The arm 172 is angular and has a length L and a width B such that it mounts the deflecting roller 170 at a sufficient distance from the bearing portion 180. The radius r of the deflecting roller 166 is dimensioned such that the control cable 46 leaves the deflecting roller at a point P which lies at a distance d of at least twice the radius r of the deflecting roller 170 from the bearing portion 180. Furthermore, the length L of the arm 162 is dimensioned such that in the starting position shown in FIGS. 17 and 18, the control cable 46 runs substantially orthogonally to the longitudinal extension direction of the leaf springs 176, 178. In other words, in this way via the control cable 46, an actuating force F can be exerted on the pivot part 182 which is oriented substantially vertically to the longitudinal extension direction of the leaf springs 176, 178.

The function of the front derailleur device 10 according to FIGS. 17 and 18 is described below.

Starting from the starting position shown in FIGS. 17 and 18, an actuating force F is exerted via the control cable 46 and moves the control cable 46. This actuating force F is deflected via the deflecting roller 170 and transmitted to the bearing portion 180 of the pivot part 182. As a result, the pivot part 182 is shifted against the spring force of the leaf springs 176 and 178, wherein these are deformed elastically. The movement of the pivot part 182 follows the arcuate track S. Depending on the movement of the control cable 46, the pivot part 182 may be deflected to a greater or lesser extent by elastic deformation of the leaf springs 176 and 178. The chain cage 24 fixed to the pivot part 182 moves together therewith, so that a bicycle chain guided therein can be shifted from one chain wheel to a further chain wheel for a gear change. After conclusion of the gear change, the pivot part 182 is fixed in its reached position by locking of the control cable 46 in the known fashion, for example at the shift mechanism 5. In order to backshift, the control cable 46 is released via the shift mechanism 5. In response to this, the leaf springs 176 and 178 can relax back into their starting position, wherein the pivot part 182 is moved back together with the chain cage 24.

Figure 19:
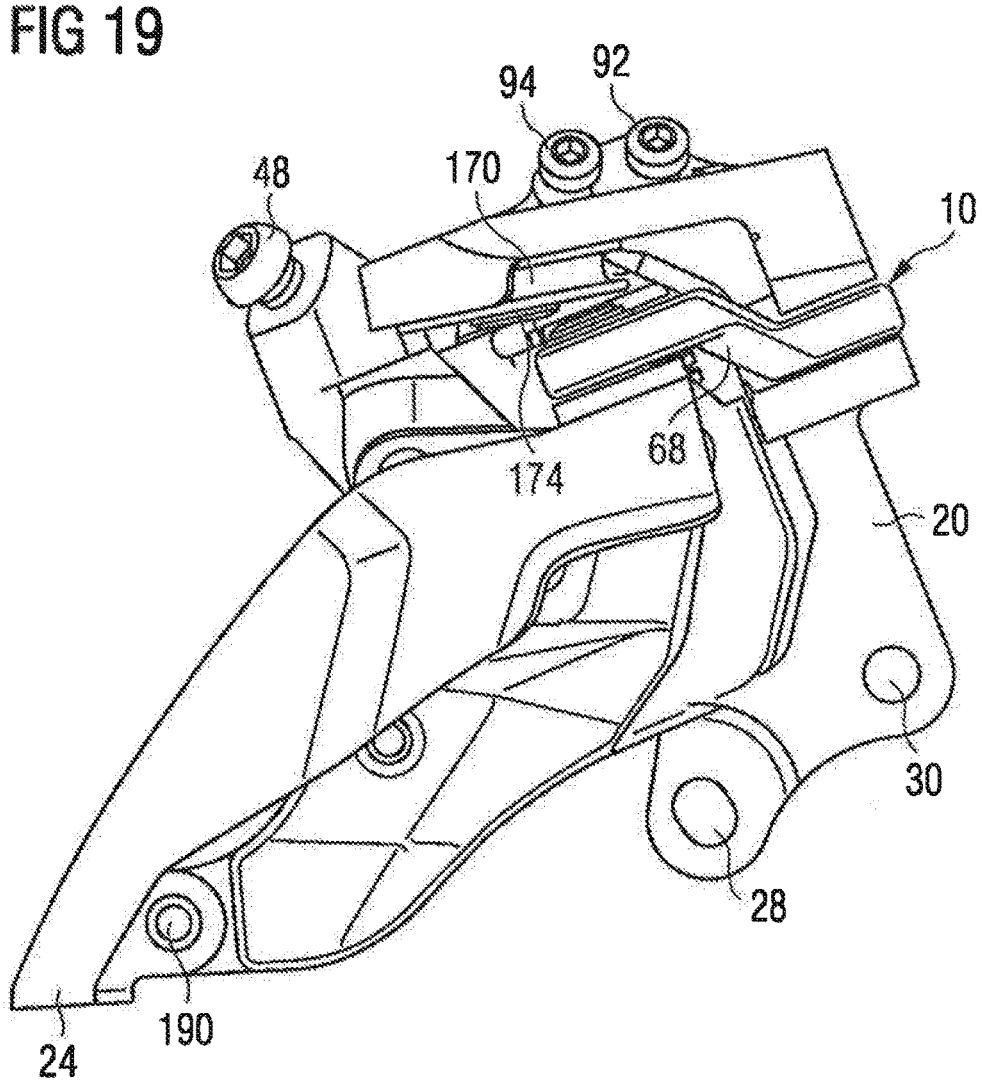
FIG. 19 is a front view of the front derailleur device according to an eighth embodiment of the invention.
Figure 20:
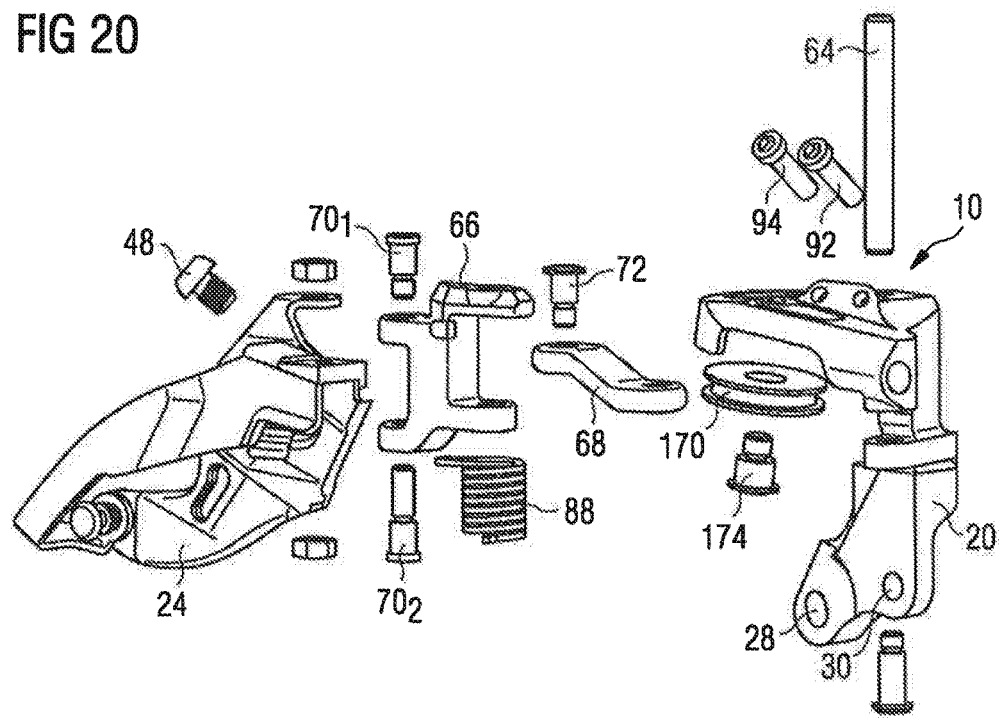
FIG. 20 is a perspective exploded view of the front derailleur device according to the eighth embodiment of the invention.
Figure 21:
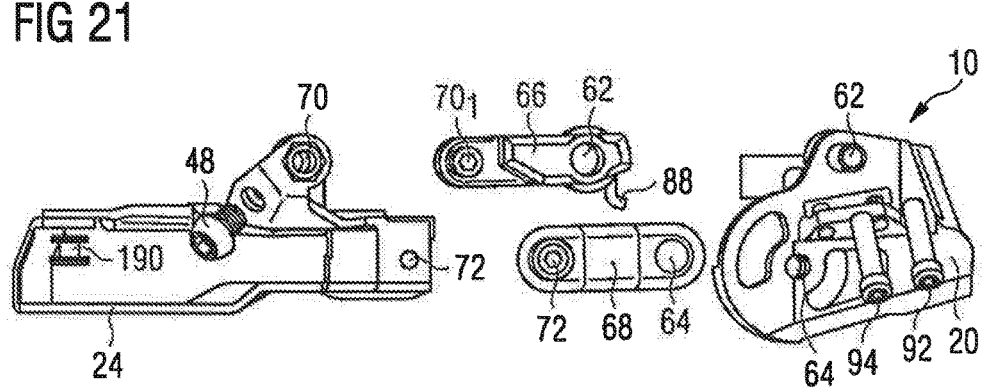
FIG. 21 is a top view of the front derailleur device according to the eighth embodiment of the invention.

Finally, FIGS. 19 to 21 show a further embodiment of the invention, wherein FIG. 19 is a front view of this embodiment and FIGS. 20 and 21 are both exploded views. Again, where applicable the same reference numerals are used as before.

In this embodiment, a deflecting roller 170 which serves for cable guidance is mounted rotatably on the frame fixing part via a bearing pin 174. The two hinged struts 66 and 68 are formed stepped and are mounted pivotably relative to the frame fixing part 20 and chain cage 24 via the bearing pins 62, 64, 70 and 72. The cable guide device 38 is also formed on the frame fixing part 20. The cable fixing device is however provided on the chain cage.

The embodiments of the invention described above disclose concepts for front derailleur devices which allow a "side swing" arrangement to be produced in compact form, wherein a great variability is possible with regard to the routing of the control cable from the derailleur device to the bicycle frame. The embodiments may be combined with each other. Thus for example, independently of the fixing of the control cable or the guidance of the control cable, a fixing to the bicycle frame may take place either above or below the hinge arrangement or by means of a clamp.

The invention claimed is:

1. A front derailleur device for a bicycle chain shift, comprising:
   a frame fixing part configured to be attachable to a bicycle frame;
   a hinge arrangement pivotable relative to the frame fixing part; and
   a chain cage pivotable relative to the frame fixing part via the pivotable hinge arrangement for guiding and pivoting of the bicycle chain,
   wherein the hinge arrangement comprises at least two hinged struts which can be mounted rotatably relative to the frame fixing part and relative to the chain cage about bearing pins and pivot axes assigned to the bearing pins,
   wherein the pivot axes run substantially parallel to each other and, in a mounted state of the derailleur device on a bicycle, are oriented substantially vertically or are tilted by a maximum of 30 degrees to a vertical axis, wherein the derailleur device can be actuated via a control cable,
   wherein the control cable can be guided relative to the bicycle frame via a cable guide device provided on the frame fixing part, the control cable can be fixed to the derailleur device via a cable fixing device, the cable fixing device provided on the frame fixing part, and the control cable is guided between the cable fixing device and the cable guide device via a cable deflecting device that is arranged on one of the hinged struts of the hinge arrangement or on the chain cage.

2. The front derailleur device according to claim 1, wherein the cable deflecting device is provided on one of the hinged struts of the hinge arrangement.

3. The front derailleur device according to claim 1, wherein the cable deflecting device is provided on the chain cage.

4. The front derailleur device according to claim 1, wherein the cable fixing device has a clamping jaw with which the control cable can be fixed via the fixing bolt.

5. The front derailleur device according to claim 1, wherein the frame fixing part has a cable function face on which the cable fixing device and/or the cable guide device are formed.

6. The front derailleur device according to claim 1, wherein the frame fixing part is provided with fixing openings which are arranged substantially above or substantially below a bearing portion for rotatable mounting of one of the hinged struts.

7. The front derailleur device according to claim 6, wherein at least one of the fixing openings is configured as a slot via which the position of the derailleur device relative to the bicycle frame can be adjusted during fixing.

8. The front derailleur device according to claim 6, wherein the bearing portion has a recess in which a free end of one of the hinged struts is received pivotably via a bearing pin.

9. The front derailleur device according to claim 1, wherein the cable deflecting device comprises a deflecting body which has a deflecting curve for guiding and deflecting the control cable.

10. The front derailleur device according to claim 9, wherein the deflecting curve is provided with at least one protruding edge portion and/or with an at least partially closed guide tunnel.

11. The front derailleur device according to claim 9, wherein the deflecting curve is provided with at least one protruding edge portion or with an at least partially closed guide tunnel.

12. The front derailleur device according to claim 9, wherein the deflecting curve extends over an angle of at least 90 degrees.

13. The front derailleur device according to claim 12, wherein the deflecting curve extends over an angle of at least 180 degrees.

14. The front derailleur device according to claim 1, wherein a receiver is assigned to at least one bearing pin, and wherein the receiver is configured to be L-shaped for unilateral guidance.

15. The front derailleur device according to claim 1, wherein a receiver is assigned to at least one bearing pin, and wherein the receiver is configured to be U-shaped for bilateral guidance.

16. The front derailleur device according to claim 1, wherein at least a first hinged strut of the hinged struts is configured with a central hinged strut portion and two bearing forks protruding from the central hinged strut portion in opposite directions.

17. The front derailleur device according to claim 16, wherein the bearing forks are configured substantially parallel to each other so that the first hinged strut of the hinged struts is configured substantially H-shaped, and wherein the deflecting body is arranged on a central protrusion of the hinged strut.

18. The front derailleur device according to claim 1, wherein at least a first hinged strut of the hinged struts is configured with an arm on which the deflecting body is arranged.

19. The front derailleur device according to claim 1, wherein the control cable is fixed to the frame fixing part by means of the cable fixing device, wherein the control cable starting from the frame fixing part is guided force-transmissively via the deflecting body arranged on one of the hinged struts or the deflecting roller, and wherein the control cable starting from the deflecting body is guided to the cable guide device and from this to the bicycle frame.

* * * * *